L. B. HARRIS.
IRRIGATING APPARATUS.
APPLICATION FILED MAR. 1, 1912.
1,058,582.
Patented Apr. 8, 1913.
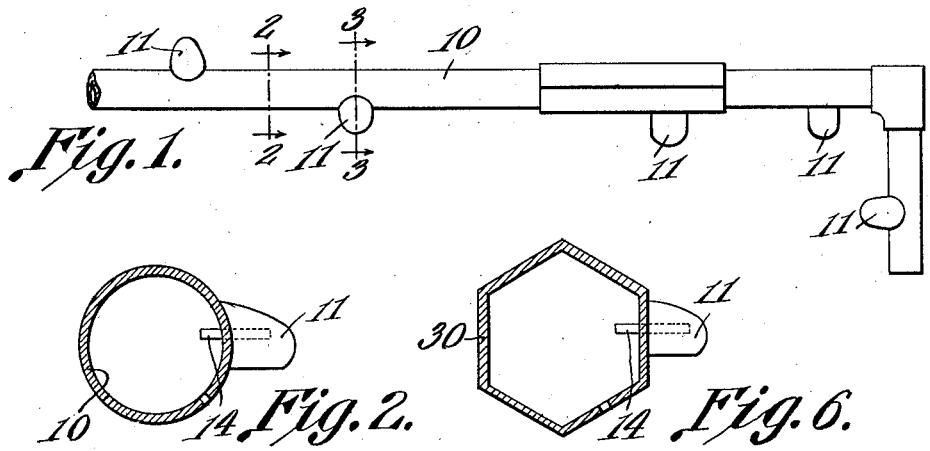
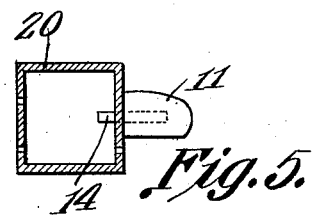
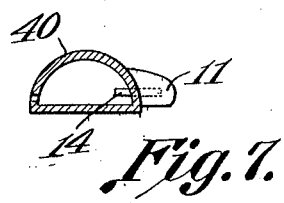
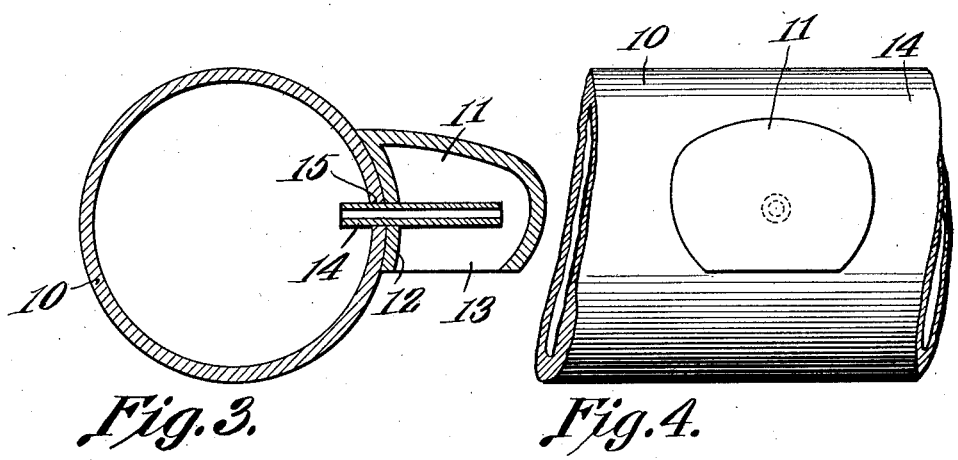
L. B. Harris,
Inventor
Witnesses
by C. A. Snow & Co.
Attorneys

UNITED STATES PATENT OFFICE.

LEROY B. HARRIS, OF BELTON, MISSOURI.

IRRIGATING APPARATUS.

1,058,582.  Specification of Letters Patent.  Patented Apr. 8, 1913.

Application filed March 1, 1912.  Serial No. 680,953.

*To all whom it may concern:*

Be it known that I, LEROY B. HARRIS, a citizen of the United States, residing at Belton, in the county of Cass and State of Missouri, have invented a new and useful Irrigating Apparatus, of which the following is a specification.

This invention relates to irrigating apparatus, such as is disclosed in Patent #994155 issued to me under date of June 6, 1911, this invention having for its particular object to provide in connection with an underground irrigating conduit having discharge orifices therein, means for protecting the orifices from becoming plugged or stopped up by roots, dirt, stones and other obstructions, and which means will permit the water to readily flow or be discharged from the conduit to moisten the soil.

With the above object in view, this invention resides in a hood of novel construction mounted on the conduit over the discharge orifice, which hood has one end wall formed to fit and abut against the conduit and having its side walls and other end wall bulged to provide a lower contracted opening disposed laterally of the axis of the orifice, and a tube passing through the former end wall with one end protruding and fitting through the discharge orifice in the conduit to support the hood and with its other end directed toward the outer or bulged end of the hood, this hood protecting the tube from becoming plugged up or stopped by roots, dirt, stones or other obstructions, and permitting the water to flow from the conduit through the tube and be discharged.

The invention is illustrated in the accompanying drawings, wherein similar reference characters indicate corresponding parts, and wherein,—

Figure 1 is a plan view of a portion of a conduit employed in an irrigating apparatus, and embodying the hood. Figs. 2 and 3 are transverse sections taken on the lines 2—2 and 3—3, respectively, of Fig. 1, these figures being on enlarged scales. Fig. 4 is a fragmental elevation of the conduit and hood applied thereto, on an enlarged scale. Figs. 5, 6 and 7 are transverse sectional views taken through various forms of conduits, which may be employed.

Referring in detail to the drawings, the conduit, designated by the numeral 10, is cylindrical and is provided with discharge orifices throughout the length thereof, this conduit in practice being embedded beneath the surface of the soil and being connected to a tank or other source of water, whereby the water gravitates through the conduit or is forced into the conduit to be discharged through the discharge orifices for the purpose of moistening or watering the soil.

Referring particularly to Fig. 3, the conduit 10 is provided with a discharge orifice 15 in one side thereof, and a hood 11 is disposed over the said orifice. This hood 11 has its inner end wall 12 concaved or formed to fit or abut against the side of the conduit 10 and has its side walls and other or outer end wall bulged, thereby providing a lower contracted opening 13, which opening is disposed laterally of the axis of the orifice 15. This hood 11 also has a tube 14 passing through the inner wall 12 thereof and protruding therefrom at its inner end and having its outer end directed toward the outer end wall of the hood. The inner end of the tube 14 is passed through the orifice 15 and thereby supports the hood upon the side of the conduit. A hood 11 may be provided for each discharge orifice of the conduit, and these hoods are adapted to be attached and detached from the conduit at will, by inserting or withdrawing the tube 14 into or from the discharge opening.

As shown in Figs. 5, 6 and 7, the respective conduits 20, 30 and 40 are square, hexagonal and semi-circular in contour and are provided with discharge orifices over which the hoods 11 may be mounted. It is therefore manifest that the irrigating conduit may be of any contour, and it is also understood that the conduit may be constructed of cement, concrete, terra-cotta, wood, clay, metal or other material, as may be desired or essential. The hoods 11 and tubes 14 may also be constructed of cement, concrete, clay, glass, metal, wood or any other suitable material, and the hoods and tubes may be constructed integral or separate as desired.

In practice, the conduits are laid below the surface of the soil, and the hoods 11 may then be attached to the conduits by inserting the protruding end of the tubes 14 into the discharge openings. This will permit the water to flow from the conduit through the tubes 14 to be discharged into the hoods 11. The water then runs from the hoods 11 through the lower openings 13 to be taken up by the soil for the purpose of supplying moisture to the vegetation growing upon the soil. The hoods 11, which have their outer end walls and side walls surrounding or encompassing the sides and outer ends of the tubes 14, prevent the tubes which communicate with or through the discharge orifices, from becoming clogged up or plugged up by roots, dirt, rocks or other obstructions. The hoods 11 also prevent the jets of water issuing from the tubes 14 from washing away the earth adjacent thereto, should the pressure of the water within the conduit be too great. The hoods may not only be supported by the tubular members 14 but may be supported from or secured to the conduit by means of cement, or in any other practicable manner.

Having described the invention, what is claimed as new is:—

1. A hood for underground irrigating conduits having one end wall formed to fit an irrigating conduit and having its side walls and other end wall bulged to provide a lower contracted opening, and a tube passing through the former end wall with one end protruding and adapted to be inserted into a discharge orifice in the conduit and with its other end directed toward the other end of the hood.

2. The combination with an underground irrigating conduit, of a tube communicating therethrough and projecting therefrom, and a hood having its outer end wall and side walls bulged and surrounding the outer end and sides of the tube and providing a contracted opening disposed laterally of the axis of the tube.

3. The combination with an underground irrigating conduit having a discharge orifice therein, of a hood having one end wall formed to fit against the conduit and having its side walls and other end wall bulged to provide a lower contracted opening, and a tube passing through the former end wall with one end inserted into the discharge orifice to support the hood and with its other end directed toward the other end of the hood.

In testimony that I claim the foregoing as my own, I have hereto affixed my signature in the presence of two witnesses.

LEROY B. HARRIS.

Witnesses:
T. P. GREEN,
W. F. BURKHART.

---

Copies of this patent may be obtained for five cents each, by addressing the "Commissioner of Patents, Washington, D. C."